United States Patent [19]
Hofmann

[11] 3,741,016
[45] June 26, 1973

[54] MACHINE FOR BALANCING MOTOR VEHICLE WHEELS

[75] Inventor: Dionys Hofmann, Darmstadt-Marienhohe, Germany

[73] Assignee: Gebr Hofmann K G, Darmstadt, Germany

[22] Filed: Jan. 14, 1971

[21] Appl. No.: 106,394

[30] Foreign Application Priority Data
Jan. 1, 1970    Germany..............P 20 01 972.1

[52] U.S. Cl. .................................................. 73/462
[51] Int. Cl. ........................................... G01m 1/22
[58] Field of Search........................ 73/66, 462, 487

[56] References Cited
FOREIGN PATENTS OR APPLICATIONS
878,637    10/1961    Great Britain..................... 73/462
895,338    5/1962    Great Britain

*Primary Examiner*—James J. Gill
*Attorney*—Cushman, Darby & Cushman

[57] ABSTRACT

A machine for balancing motor vehicle wheels including sensors for sensing the physical dimensions of the wheel to be balanced. The sensors comprise movable arms positioned along potentiometers as a function of rim diameter and depth.

7 Claims, 5 Drawing Figures

INVENTOR
DIONYS HOFMANN

BY Cushman, Darby & Cushman
ATTORNEYS

INVENTOR
DIONYS HOFMANN 3,741,016

MACHINE FOR BALANCING MOTOR VEHICLE WHEELS

BACKGROUND OF THE INVENTION

1. Field of the Invention

The present invention pertains to a machine for balancing motor vehicle wheels of different sizes and types as, for instance, passenger car wheels.

2. Discussion of the Prior Art

In all known wheel balancing machines the physical dimensions of the wheel to be balanced must be fed into the machine before it can determine the amount and angle of unbalance. This feeding of static information concerning wheel dimensions is often called "setting the machine". Wheel balancing machines are known wherein the control elements for obtaining a direct indication of the magnitude and the angular location of the unbalance are set in accordance with setting value charts. These charts which indicate the positions of at least four setting potentiometers for each wheel type are normally supplied by the wheel balancer manufacturer with the machine at the time of delivery. Consequently, each wheel type besides those included on the charts requires a new value chart. Otherwise, the users of the balancing machine must empirically find the applicable setting values which involves a considerable amount of labor and time even for skilled operators of balancing machines.

This situation is further aggravated by the fact that with greater exportation of automobiles and with the new trend of miniturization in American autos today's wheel balancer is confronted with many new wheel models not covered by the charts.

Other balancing machines are known which, because of their dependence upon a different measuring method, can do without said pre-established setting value charts. However, at least four setting means are required for such machines, namely:

one setting means for the left plane of the wheel to be balanced,
one setting means for the right plane of the wheel to be balanced,
one setting means for the diameter of the left-hand plane,
one setting means for the diameter of the right-hand plane.

The prior art has omitted the need for different setting means for the right and left-hand planes by adjustably mounting the wheel on the balancing machine axle, by means of a special device so that one plane of correction can be moved for the positioning vis a vis a fixed point of reference.

The wheel can be displaced on the machine axle with the use of a sliding flange or by means of a quill but both methods have the disadvantage that the displacement of the wheel adaptor may cause mounting errors due to eccentric clamping particularly where the gripping surface must be kept small for reasons of construction.

In addition, a displacement of wheel rims without center hub opening can be effected only in a limited degree or not at all. Furthermore, the displaceable adaptors discussed above are expensive.

SUMMARY OF THE INVENTION

It is the object of this invention to develop a balancing machine capable of balancing motor vehicle wheels, especially passenger car wheels, of various sizes and types without the need of resorting to charts or other auxiliary means. According to the invention two or three sensing devices are mounted on balancing machines for motor vehicle wheels which make it possible for the balancer through scanning of the motor vehicle wheel to determine with these sensing devices the required adjusting values, the rim diameters and rim width for wheel and to translate these values into electrical signals to the balancing machine, which constitutes a power measuring type. In FIG. 1 these three distances have been designated by the letters X, Y and R. At the same time, X has been selected for the distance between a fixed point and the inner equalizing plane or rim face resulting from the wheel being clamped down, Y has been selected for the distance between the inner and outer or the first or second equalizing planes and R for the diameter of the equalization plane or rim diameter.

Through adjustment of the sensing means as explained below the value for X, Y and R are determined and fed to the wheel balancing machine where a balancing value is recorded automatically in a known manner in grams or ounces at the pertinent angular value for each plane.

Furthermore, according to the invention, the setting means are equipped in such a way that they, are themselves capable of scanning, that is, automatically storing the adjusting values mechanically and electrically and feeding these values automatically to the electronic force measuring portion of the wheel measuring machine. An embodiment for measuring the distances X and R has been shown in FIG. 3. In this embodiment the distances X and R are found by way of a sensing means which have been shown schematically in FIG. 2 wherein the lever arrangement is moved until its thrust rod fits against the rim edge. The distance Y being the fixed distance to the outer or right-hand plane minus the distance X.

In the embodiment of FIG. 4 the distance Y is found a result of thrust rod mounted upon a hinged protective hood. The distance of the protective hood to the fixed point of the bearing is also constant. FIG. 5 shows a further embodiment which measures the values X, R and Y in yet a different manner.

BRIEF DESCRIPTION OF THE DRAWINGS

The invention is illustrated in more detail in the accompanying drawings in which.

Figure 1:
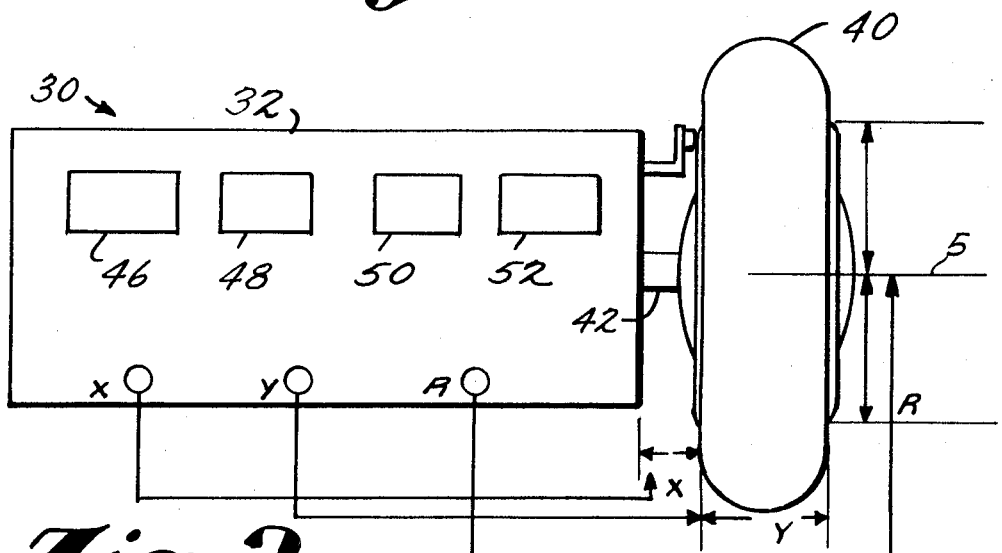
FIG. 1 shows a diagrammatic view of a first embodiment of the wheel balancing machine according to the invention.

The wheel balancing machine 30 shown in FIG. 1 includes a cabinet 32 which encloses a conventional force measuring type of wheel balancer. The force measuring wheel balancer uses the electric signals which are developed by the sensing devices 36 and 38 (described in more detail below) to set the values of the left and right rim radius "R" and the rim width Y. Then the wheel 40 is rotated about axle 42 by motor which is also enclosed within the cabinet 32 and thus is not shown. The vibrations due to the dynamic unbalance of the wheel 40 are then received by the wheel balancer 5 which transduces these signals into electric signals and compares then to the signals from sensing devices 36 and 38 to determine the amount and angular location of the unbalance along the left and right rims. The wheel balancer than transduces this electrical result into a visual numerical indication in pounds, ounces and degrees and represents the result on the windows 46 through 52 in the following manner: windows 46 and 48 show the amount and degree of unbalance along the left rim while windows 50 and 52 show the amount and degree of unbalance along the right rim.

Figure 2:
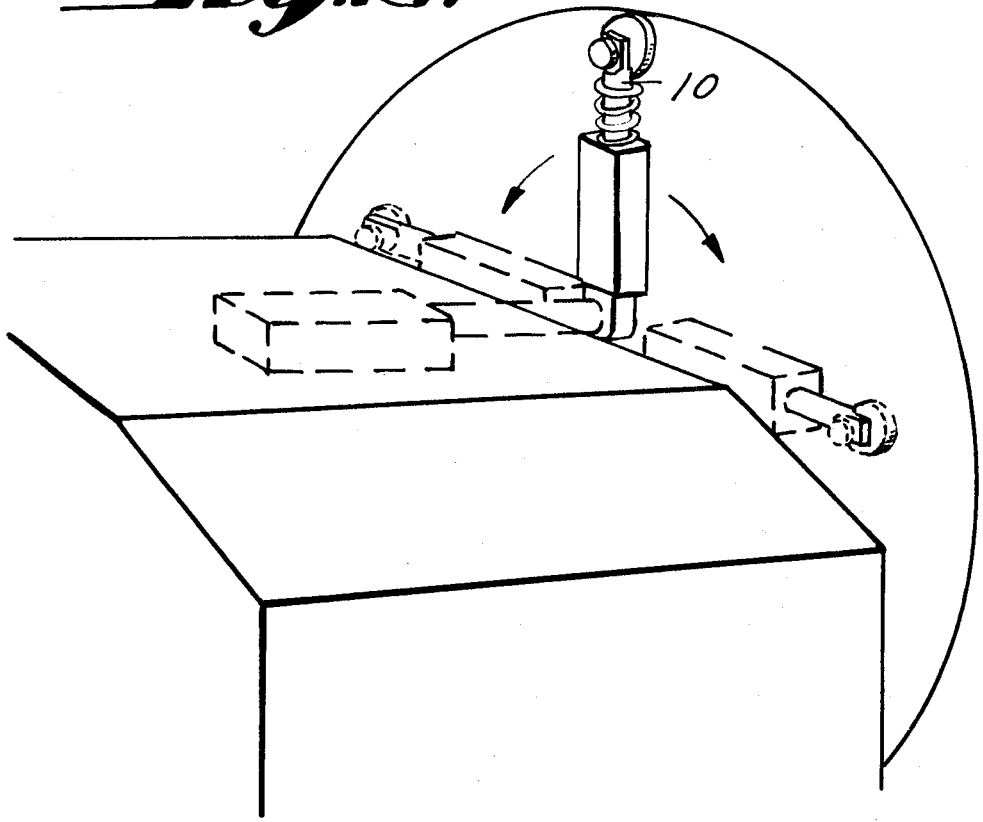
FIG. 2 is a diagrammatic perspective view of the top of the wheel balancing machine and sensing devices.
Figure 3:
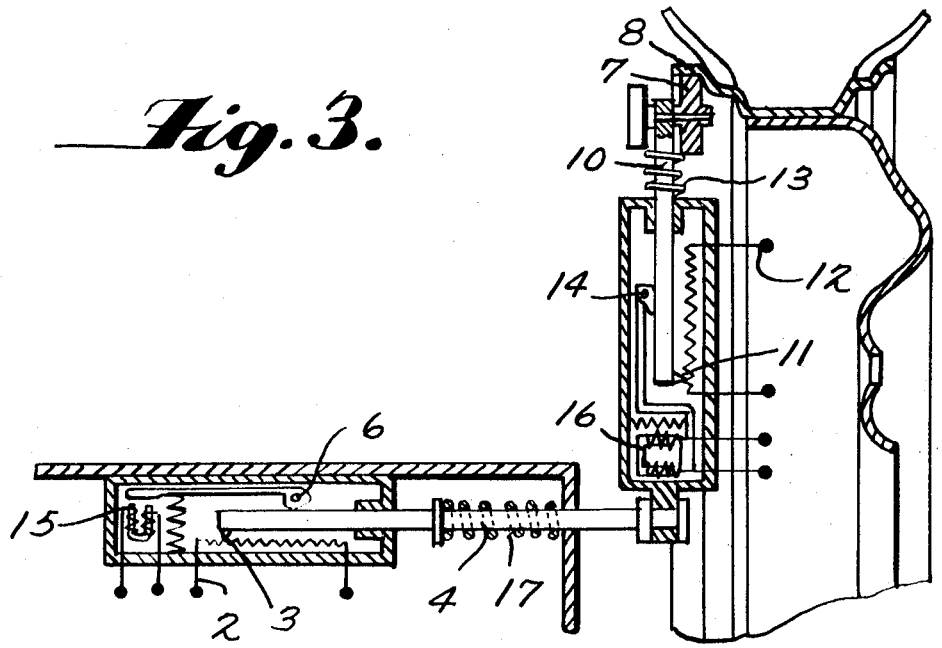
FIG. 3 is a sectional view through part of the sensing devices in FIG. 2 taken along the center lines thereof.

The construction and operation of a sensing devices 36 and 38 is illustrated in FIGS. 2 and 3.

A potentiometer 2 with a movable arm 3 is so arranged at the upper part 1 of the machine that the push rod 4 can be moved in parallel with the axis 5 of the machine and but only in the rightward direction. The pawl 6 prevents the push rod 4 from being pushed back to the left. The push rod continues to be moved to the right until the feeler roll 7 makes contact with the rim edge 8. The potentiometer 2 is locked in this way to the specific dimension of the left-hand rim edge i.e. the X dimension of FIG. 1.

The sensing means for the diameter of correction, the R dimension of FIG. 1, comprises the push rod 10, the movable arm 11, the potentiometer 12, the spring 13, and the pawl 14. The complete diameter sensing element is pivotally mounted on the push rod 4.

These elements operated in a manner identical to the elements described above. In other words, the push rod 10 is extended until feeler roll 7 makes contact with the nearest point of contact with the rim felloe: (see FIG. 2). This sets the movable arm 11 on potentiometer 12 to record an electrical characteristic proportional to the diameter of the left hand rim. The push rod 10 is then locked into its extended position by the pawl 14.

The use of the diameter sensing element is shown in FIG. 2. After adjusting the push rod 4 the diameter measuring element is pivoted to a vertical position for measuring the diameter of correction. Once the X and R dimensions have been sensed the electrical values proportional thereto are locked into potentiometers 2 and 12, respectively and the wheel 40 must be rotated to feed kinetic information to the wheel balancing machine as is described above.

In order to insure that there is no contact between feeler roller 7 and rim edge 8 when the wheel is rotating the push rod 10 is pivoted either clockwise or counter-clockwise 90° about push rod 4 whence it comes to rest on one or the other of two stops there provided.

Once the positions of moveable arms 3 and 11 on potentiometer 2 and 12, respectively, are determined as described above the dimension Y has also been fed to the wheel balancer since the distance Y is a known constant and the distance X has been measured.

Upon completed balancing, the electromagnets 15 and 16 can be actuated, for instance, by depressing a button (not shown) which will release the pawls 6 and rod 14. The push rod 4 is moved back into the left initial position with the aid of the spring 17, and the push rod 11 is returned into the upper initial position by means of the spring 13. Thus, the feeling device is cleared to handle the next type of wheel.

Figure 4:
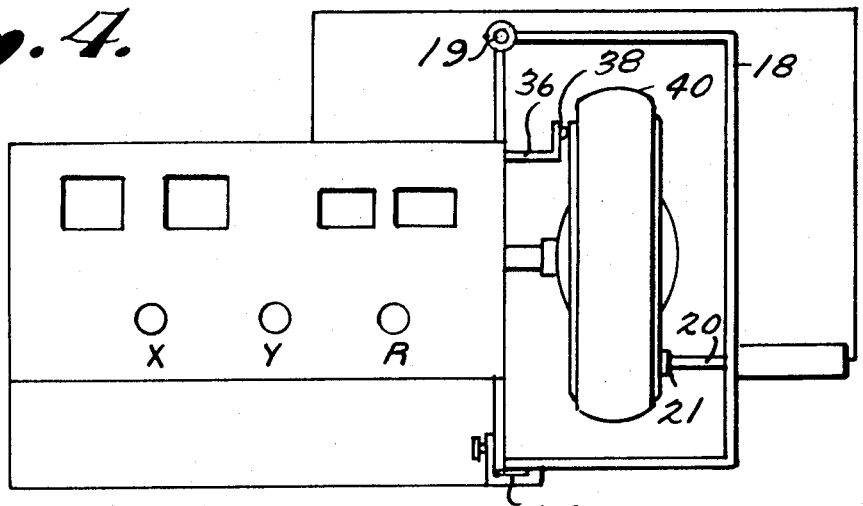
FIG. 4 shows a diagrammatic view of a second embodiment of the wheel balancing machine according to the invention.

If it is desired to obtain a more accurate indication of the distance Y than is possible from the embodiment of FIG. 1 the embodiment of FIG. 4 can be used. This embodiment includes all of the elements of the embodiment of FIG. 1 plus a hood 18 which pivots about hinge 19 and locks at locking device 22. The rod 20 and roller 21 is shifted in exactly the manner described above with respect to the sensing devices shown in FIG. 3 to record the distance A−(X+Y). Since A, the width of the hood is fixed and the distance X is measured by the sensing device 36 the distance Y is exactly determined.

Figure 5:
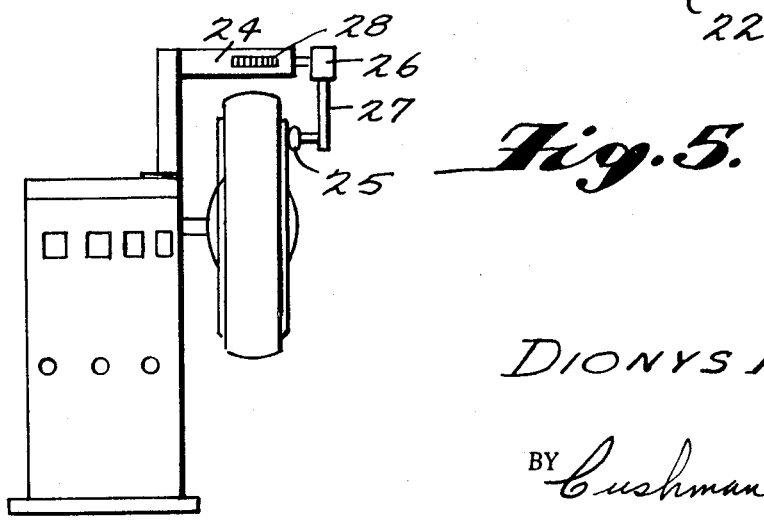
FIG. 5 shows a (diagrammatic side view) third embodiment of the balancing machine.

FIG. 5 shows yet another embodiment which is very similar to the embodiment of FIG. 1 except that the sensing devices 36 and 38 are replaced by movable arms 24 and 27 which are essentially identical in construction and operation to the arms 36 and 38 respectively. Similarly, the roller 25 is equivalent to the roller 7 described above in construction and operation. The embodiment of FIG. 5 produces the quantities X, Y, and R as in the manner described with respect to the embodiment of FIG. 1 and then the measuring rod 26 is pushed out of the plane and the lever 27 is turned upwards so that the latter will not impede the wheel 40 during rotation. Scanning is accomplished prior to balancing and during balancing the scanning arms moved out of the way during rotation of the tire.

While the above descriptions cover the preferred embodiments of the invention it should be obvious to one skilled in the art that various modifications are possible within the scope of applicant's invention. Thus, for example the embodiments of FIGS. 1 and 5 could be combined into a single device which would provide accurate radii for each side of the rim as well as an accurate rim width Y.

What is claimed is:

1. In a balancing machine for the wheels of motor vehicles of different size and types each having a rim, especially for the wheels of passenger cars which are fixedly clamped onto a rotating spindle for measuring balance by measuring means without specified values from a table and whereby the balancing machine will automatically provide an indication of the quantitative and angular values of unbalance for both planes of the wheel undergoing balancing, the improvement comprising, first sensing means for measuring the distance from a known point to one plane of said rim, second sensing means for measuring the radius of said rim, setting means associated with said first and second sensing means for deriving from the measurements of said first and second sensing means electrical signals, storing the values of these signals, and transmitting these signals to said measuring means.

2. The wheel balancing machine as recited in claim 1 wherein said first and second sensing means comprise two mechanically adjustable arms having at least one means for contacting the wheel rim and two potentiometers and said setting means comprises contact points on the respective potentiometers connected to said arms so that electrical values are indicated on said potentiometers which correspond to the adjustment of said arms, wherein one of said arms is adapted to measure the radius of the wheel rim while the other arm is adapted to measure the distance from a known point to one plane of the rim.

3. The wheel balancing machine as recited in claim 2 wherein the arm for measuring the rim radius is mounted at the free end of and perpendicular to the longitudinal axis of the arm for measuring the distance to one plane of the rim.

4. The wheel balancing machine as recited in claim 3 further including means for clamping said contact points to said potentiometers so that said potentiometers retain their readings.

5. The wheel balancing machine as recited in claim 4 wherein said clamping means includes electrical operators and said operators are controlled by at least one switch.

6. The wheel balancing machine as recited in claim 3 wherein means are provided to removing said arms from contact with said rim without changing the mechanical adjustments thereof.

7. The wheel balancing machine as recited in claim 1 further including a third sensing means and a third setting means associated therewith for measuring the distance from a known point to the plane of the other rim.

* * * * *